United States Patent [19]

Franken et al.

[11] Patent Number: 5,480,274

[45] Date of Patent: Jan. 2, 1996

[54] AIRCRAFT TUG WITHOUT TOW BAR

[75] Inventors: Wilhelm Franken, Wesel; Gerhard Weigardt, Oberhausen; Lars T. Michaelsen, Hardecke, all of Germany

[73] Assignee: Man Gutehoffnungshütte, Oberhausen, Germany

[21] Appl. No.: 273,029

[22] Filed: Jul. 8, 1994

[30] Foreign Application Priority Data

Jul. 9, 1993 [DE] Germany .......................... 43 22 985.9

[51] Int. Cl.[6] .................................................. B64F 1/22
[52] U.S. Cl. ........................ 414/429; 414/426; 180/904
[58] Field of Search ...................................... 414/426–430, 414/474, 476; 180/904; 244/50; 280/402

[56] References Cited

U.S. PATENT DOCUMENTS

| 2,798,729 | 7/1957 | Paul | 180/904 X |
|---|---|---|---|
| 4,997,331 | 3/1991 | Grinsted et al. | 414/429 |
| 5,051,052 | 9/1991 | Franken et al. | 414/428 |
| 5,054,714 | 10/1991 | Franken et al. | 244/50 |
| 5,259,572 | 11/1993 | Franken et al. | 414/429 X |
| 5,308,212 | 5/1994 | Pollner et al. | 414/428 |
| 5,314,287 | 5/1994 | Wichert | 414/430 X |

FOREIGN PATENT DOCUMENTS

| 0269685 | 10/1989 | European Pat. Off. . | |
| 3917255 | 11/1990 | European Pat. Off. . | |
| 0530456 | 3/1993 | European Pat. Off. | 180/904 |
| 4129407A1 | 3/1991 | Germany . | |
| 3931646 | 4/1991 | Germany . | |
| 4131649 | 3/1993 | Germany . | |
| 8908583 | 9/1989 | WIPO | 414/426 |

Primary Examiner—David A. Bucci
Assistant Examiner—James W. Keenan
Attorney, Agent, or Firm—McGlew and Tuttle

[57] ABSTRACT

An aircraft tug without draw tongue, with a chassis divided by means of an axially parallel buckling axle. The pickup device for the nose landing gear (nose wheels 27) of an aircraft is arranged within the fork-shaped recess of the chassis, which is formed by the lifting rockers. This pickup device includes a lifting platform, a pendulum tie-bar, telescopic arms with gripping arms, a push-out tie-bar, a crossbar, longitudinal swinging arms, and a pendulum pin. The pendulum tie-bar, the lifting platform with the telescopic arms, including the push-out tie-bar and the longitudinal swinging arms, are connected to the lifting rockers of the chassis rear part via coupling members. The pendulum tie-bar has a pendular mounting, and pendular movement of the lifting platform and of the pendulum tie-bar is guaranteed in conjunction with the pivotably mounted lifting platform. Since the height-adjustable telescopic arms are pivotably linked to the lifting platform and to the pendulum tie-bar, they are able to participate in the pendular movement.

2 Claims, 5 Drawing Sheets

AIRCRAFT TUG WITHOUT TOW BAR

FIELD OF THE INVENTION

The present invention pertains to an aircraft tug without draw tongue (tow bar) with a chassis, which is divided by means of an axially parallel buckling axle, and whose driven front axle is fastened to a front part, and whose rear axle transmission is fastened to lifting rockers, as a result of which the rear part of the chassis forms a fork-shaped recess for picking up the nose wheels of the aircraft, and wherein the pickup device for the nose wheels is connected to the front part of the chassis within the recess.

BACKGROUND OF THE INVENTION

Aircraft tugs without a draw tongue for towing aircraft for moving aircraft at airports have been known since the mid-1980s. They have meanwhile been used for operations such as push-back, towing maneuvers in aircraft yards and hangars, and as tugs for longer distances within the premises of airports.

The tug for towing an aircraft without a draw tongue according to EP 0,269,685 B1 (corresponding to U.S. Pat. No. 4,810,157), which is also designed for moving aircraft at higher speeds over longer distances, has proved to be successful in use at domestic and foreign airports.

Another aircraft tug without draw tongue according to DE 41 29 407 A1, which has a shorter and more compact design and also has a lower drive output than the aforementioned vehicle, is intended primarily for use as a push-back tug, i.e., for maneuvering aircraft from the telescopic gangway to the apron.

SUMMARY AND OBJECTS OF THE INVENTION

It is the object of the present invention to provide an aircraft tug without a draw tongue, which is suitable for performing any movement of aircraft which is necessary on the premises of airports. The aircraft tug shall be able to pick up even very high nose wheel loads (e.g., 500 kN). The pickup kinematics of the aircraft tug shall be designed for commercial aircraft with nose wheels with diameters ranging from very low values (e.g., ca. 600 mm diameter) to very high ones (e.g., ca. 1,250 mm diameter).

According to the invention, the objects of the invention are attained by providing an aircraft tug without a draw tongue or tow bar which includes a front chassis part and a rear chassis part, the front and rear chassis parts being divided by an axile parallel buckling axle. A front axle is provided which is preferably a driven axle fastened to the front chassis part, the rear chassis part being provided as a fork-shape to provide a recess for picking up a nose wheel of an aircraft. A pick tip device is provided connected to the front part of the chassis within the recess. The pick up device consists of a lifting platform with a support surface for the nose wheels, a pendulum tie-bar telescopic arms with gripping arms, a push-out tie-bar, a crossbar, longitudinal swinging arms and a pendulum pin. The lifting platform, the pendulum tie-bar and the telescopic arms are mechanically connected to the crossbar via the pendulum pin. The pendulum tie-bar is able to perform a pendular movement in both directions around the pendulum pin. Pivoting bearings are provided for guaranteeing degrees of freedom of the longitudinal swinging arms. Drag bearings are provided for pivoting the telescopic arms. Further drag bearings are provided for rotary movements of the crossbar. The rear chassis part has lifting rockers. The lifting rockers are connected to the pick up device via coupling members. Bearings are provided in each side of each of the coupling members whereby the each coupling member can be pivoted around a bearing. Each lifting rocker is pivotable around a bearing of the buckling axle. The longitudinal swinging arms are deflected in a corresponding direction of the pendular movement during the pendular movement of the pendulum tie-bar around the pendulum pin. The lifting platform performs a vertical pivoting movement via the vertical drag bearings. The telescopic arms with gripping arms and the push-out tie-bar with the shifting device are linked to the lifting platform in a continuously height-adjustable manner by means of the first drag bearings on the pendulum tie-bar and via adjusting members. The crossbar is linked to the front part of the chassis via drag bearings.

The front part and the rear part of the chassis are designed separately in the tug according to the present invention as well, as has been known for the aircraft tug according to EP 0 269 685 B1. The front and the rear part are connected to one another by means of a single buckling axle, which is designed to be parallel to the front axle and the rear axle. To pick up the nose wheels of the aircraft, the rear part of the aircraft tug is lowered, as is described in connection with the aircraft tug according to the above-mentioned document, by means of piston-and-cylinder units, and it is brought into the stretched-out chassis position by means of the same piston-and-cylinder units for transporting the aircraft, A pendulum tie-bar and the lifting platform with the telescopic arms linked to it, as well as a crossbar and longitudinal swinging arms are mechanically connected to the lifting rockers of the rear part of the chassis via coupling members in the aircraft tug according to the present invention, so that when the chassis is buckled, the nose wheel pickup device is lowered onto the pavement in the downward direction or to slightly above the pavement, and it is automatically raised into a defined transport position when the chassis is stretched out.

The nose wheel pickup device, comprises of the lifting platform, the pendulum tie-bar, the telescopic arms with pivotable gripping arms and with the push-out tie-bar, the crossbar, the longitudinal swinging arms, and the pendulum pin, is able to pick up nose wheels of commercial aircraft of practically any type, and the drive of the aircraft tug is designed such that the vehicles are able to perform any maneuvering movements required at an airport even with very high nose wheel loads and consequently with very large aircraft semimounted on them.

The lifting platform is connected to the pendulum tie-bar with drag bearings, and it is connected to the front part of the tug chassis via the pivoting bearings of the longitudinal swinging arms.

The pendulum tie-bar is connected to the pendulum pin and to the crossbar via drag bearings.

During travel of the aircraft tug in curves, a simultaneous pendular movement of the lifting platform and of the pendulum tie-bar is also guaranteed to the extent of the possible pivot angles as a consequence of the pendular mounting of the pendulum tie-bar in conjunction with the drag bearings of the lifting platform.

Since the telescopic arms with their gripping arms, as well as the push-out tie-bar are also linked to the lifting platform by drag bearings on the pendulum tie-bar and in a continuously height-adjustable manner via adjusting members, these elements of the nose wheel pickup device also perform the pendular movements, together with the lifting platform and the pendulum tie-bar.

A particular advantage of the nose wheel pickup device according to the present invention with continuously height-adjustable telescopic arms can be considered to be the fact that an optimal contact point on the nose wheel in question can be achieved with this at any time for the entire range of nose wheel diameters, i.e., during the picking up of the nose wheel, during its clamping onto the lifting platform, and, finally, during deposition on the pavement.

The pendulum pin is arranged within the pendulum tie-bar in a positive-locking manner in the design according to the present invention, and it is connected to the front part of the chassis via drag bearings of the crossbar. Thus, no additional forces, which result from the linking of the pickup device to the front part, will act on the nose wheel.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

The complete chassis front part and the tug as a whole with the front axle and the front wheels, the cabin for the tug operator, the tug drive, etc., are not represented in any of the figures, because these features belong to the state of the art. For example, these features can be found in U.S. Pat. Nos. 5,051,052 and 5,054,714 which are hereby incorporated by reference.

Figure 1:
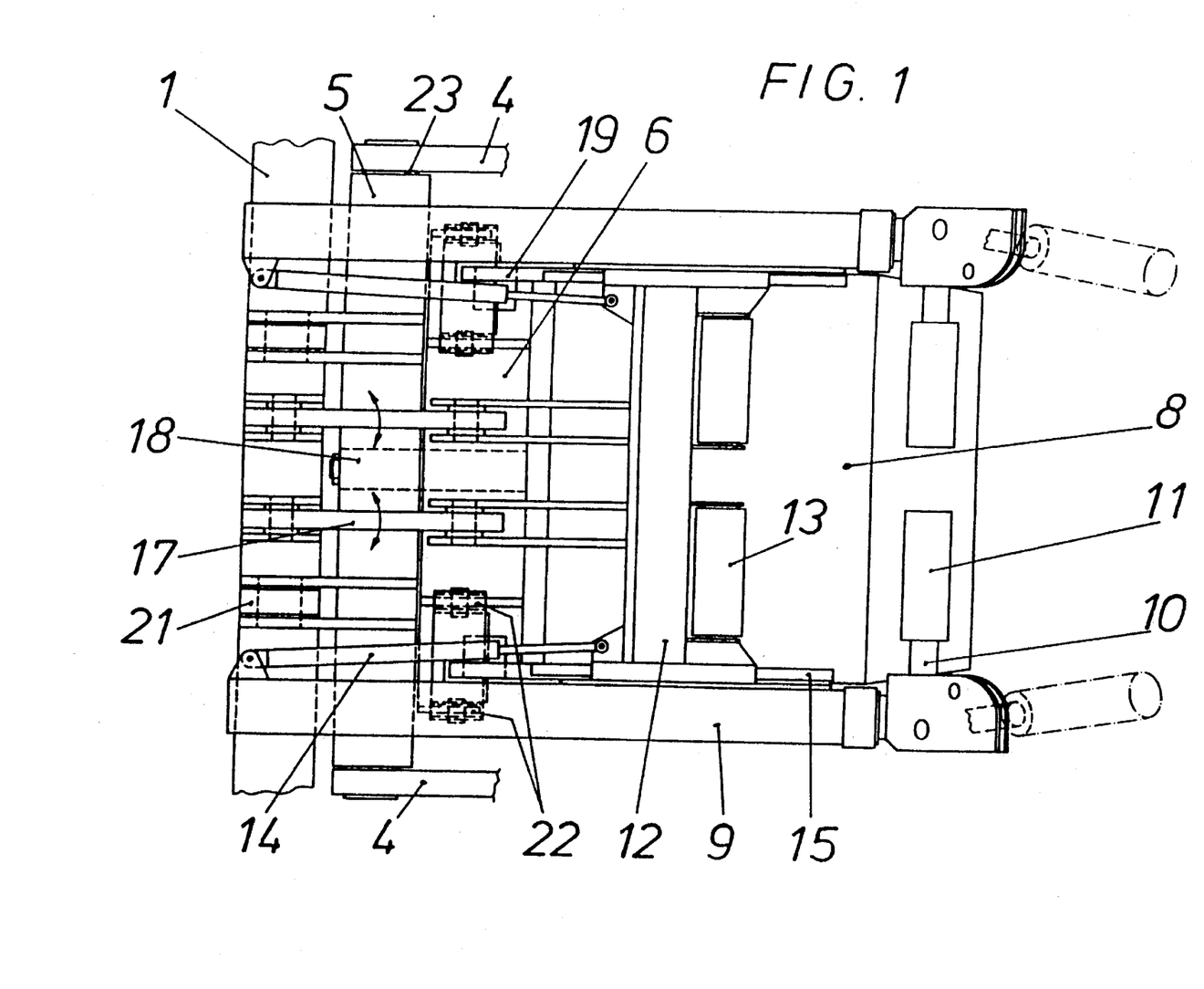
FIG. 1 is a top view of the nose wheel pickup device according to the present invention.

The pickup-device of the aircraft tug for the nose wheels can be recognized in the top view according to FIG. 1. The support surface of the lifting platform 7 (shown in FIG. 2) is designated by reference numeral 8. The telescopic arms 9 with the gripping arms 10 and with the rollers 11 are represented to the side of the lifting platform. The gripping arms are pivotable to the inside.

The longitudinal guides 15 for the push-out tie-bar 12 are located on the insides of the telescopic arms 9. The push-out tie-bar 12 can be pushed to and fro by means of a shifting device 14. Rotatable rollers 13 are arranged on the push-out tie-bar. A hydraulic cylinder is represented as the shifting device 14 for the push-out tie-bar 12 in the exemplary embodiment. However, the shifting device may also have an electrical drive.

The lifting platform 7 is connected to the pendulum tie-bar 6 via drag bearings (vertical drag bearings) 19, and the pendulum tie-bar 6 is in turn connected to the crossbar 5 via the pendulum pin 18 via drag bearings (not shown).

The crossbar 5 is linked to the front part 1 of the tug chassis by means of drag bearings 21.

The coupling of the pickup device with the lifting rockers of the chassis rear part via coupling members 4 is indicated in FIG. 1.

Figure 2:
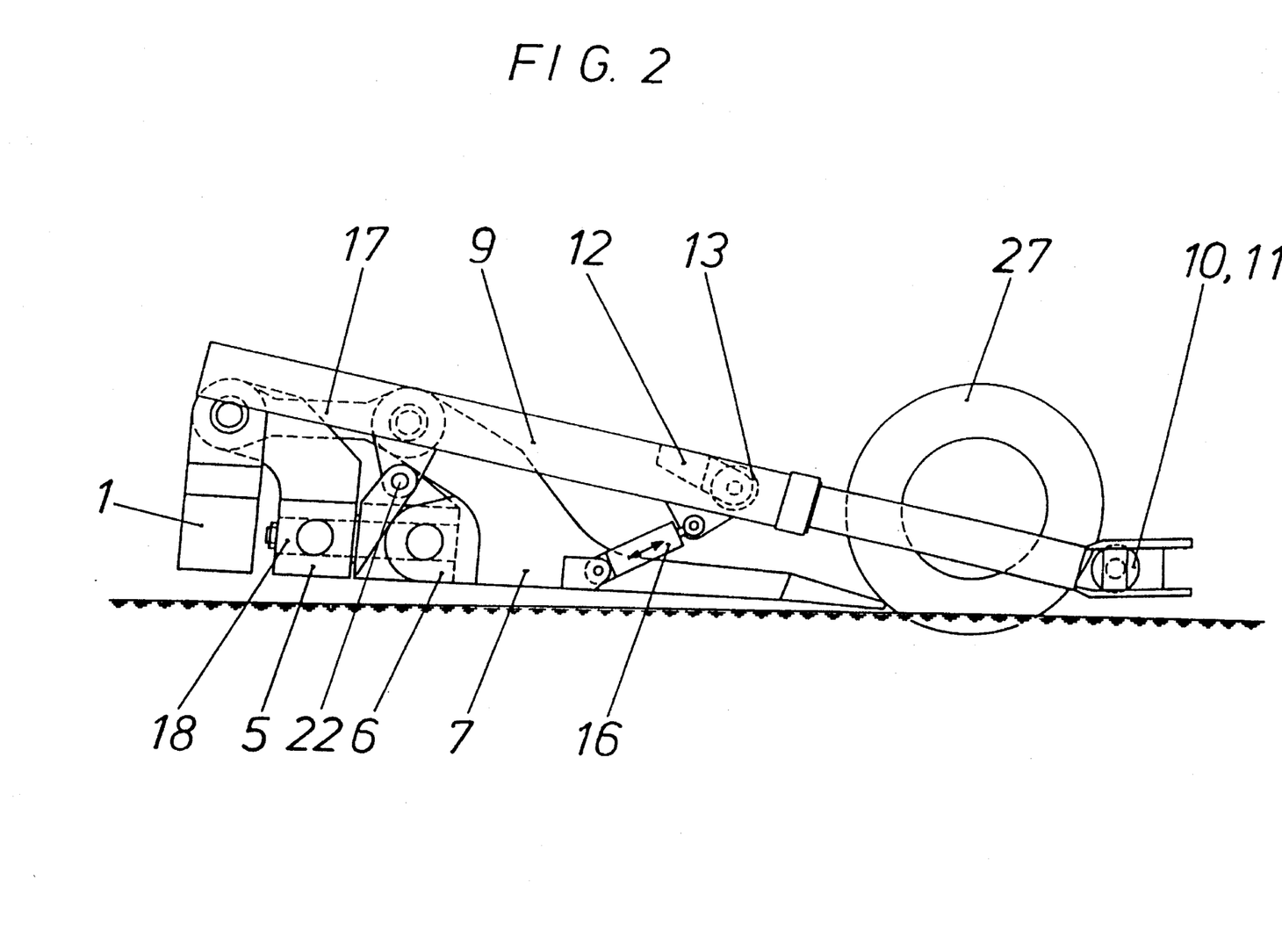
FIG. 2 is a side view of the pickup device with the nose wheels still standing on the pavement.

According to FIG. 2, the aircraft tug with the lifting platform 7 is in the pickup position in front of the nose wheels 27 of the aircraft. The telescopic arms 9 are swung in the downward direction, the adjusting members 16 have been withdrawn, and the gripping arms 10 of the telescopic arms have surrounded the nose wheels 27.

Part of the chassis front part 1, the crossbar 5, as well as the pendulum tie-bar 6 can be recognized. A longitudinal swinging arm 17 and the push-out tie-bar 12 with the rollers 13 are represented by a broken line.

The lifting platform 7 is connected via the drag bearings 19 to the pendulum tie-bar 6 and via the pivoting bearings 20 of the longitudinal swinging arms 17 to the front part 1 of the chassis.

The pendulum tie-bar 6 is connected to the crossbar 5 via the pendulum pin with the drag bearings 18.

Figure 3:
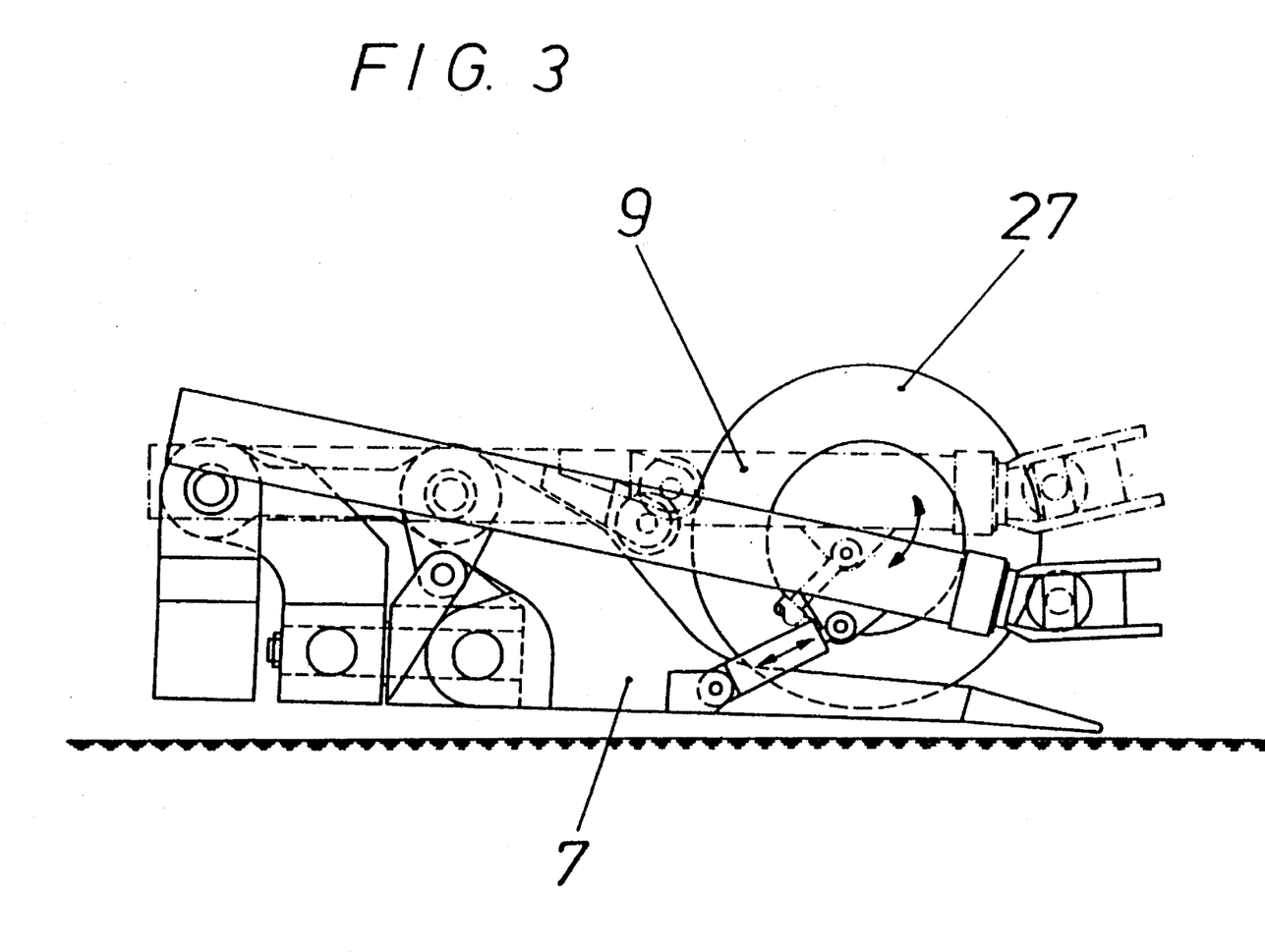
FIG. 3 is a side view of the pickup device with the nose wheels on the lifting platform.

FIG. 3 shows the situation in which the nose landing gear with the nose wheels 27 is located on the support surface 8 of the lifting platform 7. The telescopic arms 9 have embraced the nose wheels with their gripping arms 10.

The telescopic arms 9 represented by broken lines with the gripping arms 10, as well as the push-out tie-bar 12 show the state after clamping the nose wheels 27 onto the lifting platform 7.

Figure 4:
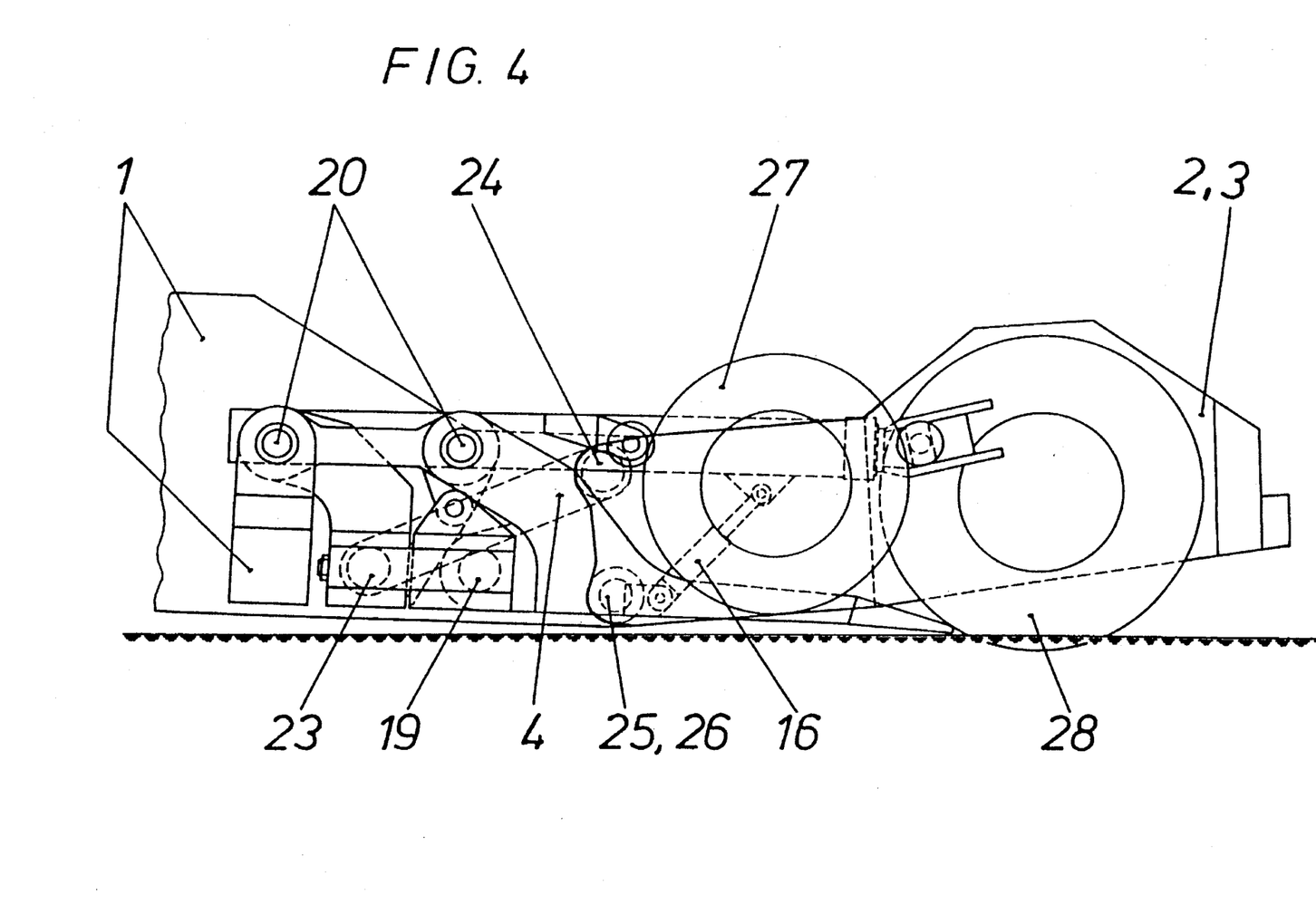
FIG. 4 is a side view similar to that in FIG. 3, with representation of the complete chassis rear part.

FIG. 4 is similar to FIG. 3. However, the complete chassis rear part 2 with the rear wheels 28 and the lifting rockers 3 are additionally recognizable. The nose wheels 27 are located on the lifting platform 7. The chassis rear part 2 is buckled via the buckling axle 26, so that the lifting platform 7 with its pickup slope is still located on or slightly above the pavement.

The buckling axle 26, a bearing 25 of the buckling axle, the coupling member 4 with the bearing 23 on the crossbar 5 and with the bearing 24 on the lifting rocker 3 are some of the parts represented by broken lines.

Figure 5:
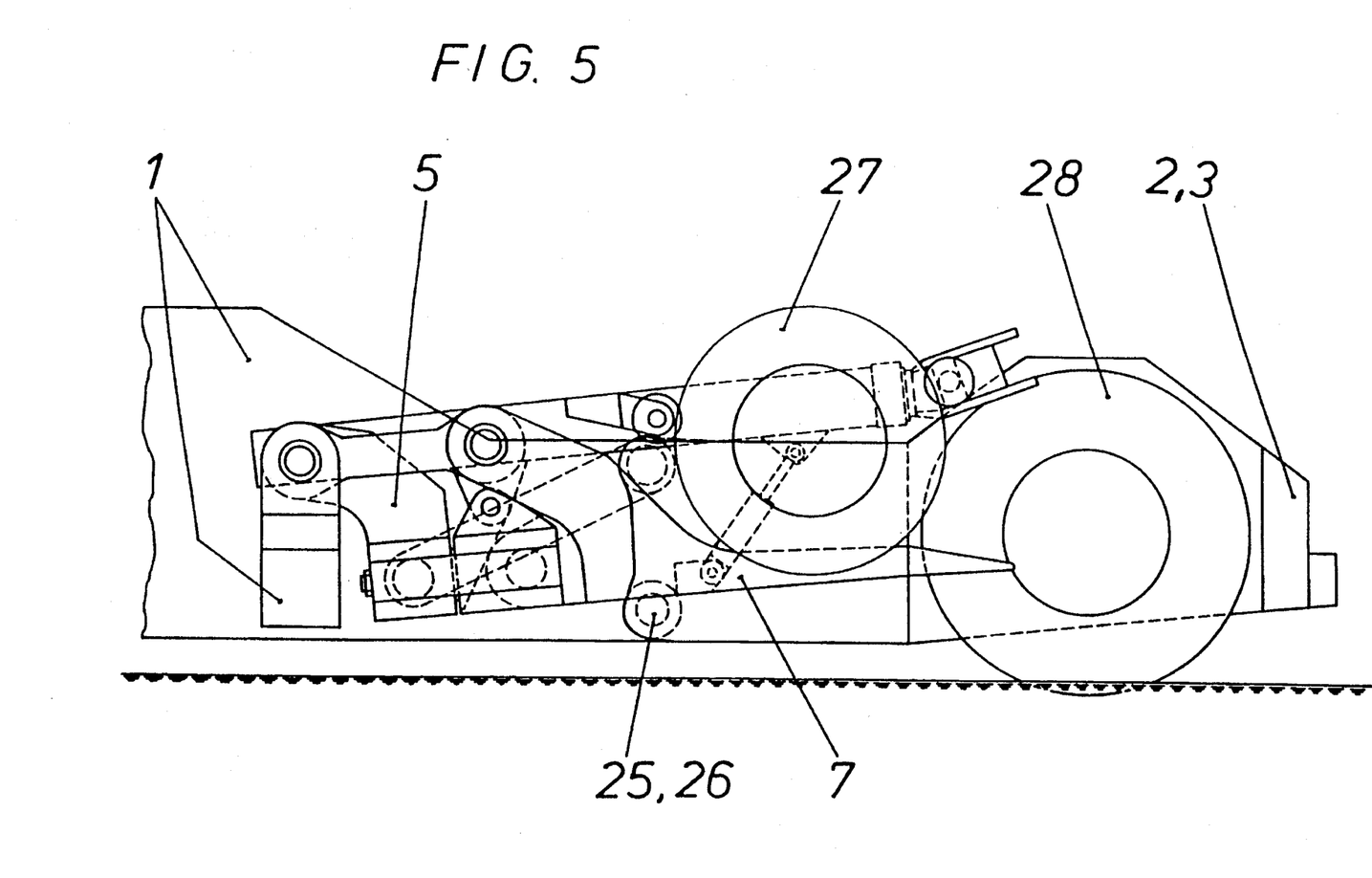
FIG. 5 is a side view similar to that in FIG. 4; but with clamped nose wheels located in the transport positions.

FIG. 5 shows the chassis rear part 2 with the nose wheels 27 picked up and clamped in the transport position on the support surface 8 of the lifting platform 7. The tug is in the stretched-out position, i.e., the chassis rear part 2 has been raised above the hinge (the bearing 25) of the buckling axle 26. The buckling axle 26 is raised and lowered, as is known from EP 0 269 685 B1, by means of a pair of hydraulic piston-and-cylinder units, which are not represented here. These extend on both sides of the tug. They are linked to the front part of the chassis and to the lifting rockers.

FIGS. 4 and 5 clearly show (by broken lines) the coupling of the nose wheel pickup device with the lifting rockers 3 of the chassis rear part 2 via the coupling members 4.

It is not necessary to describe the processes involved in the picking up of the nose wheels on the lifting platform, the clamping of the nose wheels picked up, the subsequent transport of the aircraft, and the final deposition of the nose landing gear on the pavement, because these processes have been sufficiently known in the state of the art. While a specific embodiment of the invention has been shown and described in detail to illustrate the application of the principles of the invention, it will be understood that the invention may be embodied otherwise without departing from such principles.

What is claimed is:

1. An aircraft tug without tow bar, comprising:

a front chassis part and a rear chassis part, the front and rear chassis parts being divided by an axile parallel buckling axle, the front chassis part having a front axle provided as a driven axle fastened to the front chassis part, the rear chassis part being provided as a fork-shape to provide a recess for picking up a nose wheel of an aircraft;

a pick up device provided connected to the front chassis part within the recess, the pick up device including a lifting platform with a support surface for the nose wheel, a pendulum tie-bar, telescopic arms with gripping arms, a push-out tie-bar, a crossbar, longitudinal swinging arms and a pendulum pin, the lifting platform, the pendulum tie-bar and the telescopic arms being mechanically connected to the crossbar via the pendulum pin, the pendulum tie-bar being able to perform a pendular movement in each of two directions of movement around the pendulum pin;

vertical drag bearings connecting said lifting platform to said pendulum tie-bar;

pivoting bearings connected to the longitudinal swinging arms for (guaranteeing) providing the longitudinal swinging arms with degrees of freedom;

first drag bearings connected to the telescopic arms whereby the telescopic arms may be pivoted;

further drag bearings connected to the crossbar whereby the crossbar may be moved;

lifting rockers connected to the rear chassis part;

a shifting device connected between said front chassis part and said push-out tie-bar;

coupling members, said lifting rockers being connected to the pick-up device by said coupling members;

bearings on each side of each of the coupling members whereby the each coupling member can be pivoted around one of the bearings, each lifting rocker being pivotable around a bearing of the buckling axle, the longitudinal swinging arms being deflected in a corresponding direction of the pendular movement during the pendular movement of the pendulum tie-bar around the pendulum pin, whereby the lifting platform performs a vertical pivoting movement via said vertical drag bearings, the telescopic arms with gripping arms and the push-out tie-bar with the shifting device are linked to the lifting platform by means of said first drag bearings on said pendulum tie-bar and via adjusting members and said crossbar is linked to the front part of the chassis via said further drag bearings.

2. Aircraft tug in accordance with claim 1, wherein the coupling members are adjustable in length.

* * * * *

UNITED STATES PATENT AND TRADEMARK OFFICE
CERTIFICATE OF CORRECTION

PATENT NO. : 5,480,274
DATED : January 2, 1996
INVENTOR(S) : FRANKEN et al.

It is certified that error appears in the above-identified patent and that said Letters Patent is hereby corrected as shown below:

On the title page, items [75] and [73] as follows:

[73] Assignee: MAN GUTEHOFFNUNGSHÜTTE, Oberhausen, Germany.

Signed and Sealed this

Fourth Day of March, 1997

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,480,274
DATED : January 2, 1996
INVENTOR(S) : FRANKEN et al.

It is certified that error appears in the above-indentified patent and that said Letters Patent is hereby corrected as shown below:

On the title page, item [75] should read as follows:

--[75] Inventors: Wilhelm Franken, Wesel; Gerhard Weigardt, Oberhausen; Lars Torsten Michaelson, Hardecke, all of Germany Signed and Sealed this Twenty-sixth Day of August, 1997

Attest:

BRUCE LEHMAN

Attesting Officer

Commissioner of Patents and Trademarks